United States Patent
Lu (10) Patent No.: US 11,388,737 B2
(45) Date of Patent: Jul. 12, 2022

(54) METHODS AND DEVICES FOR SEMI-PERSISTENT SCHEDULING

(71) Applicant: Telefonaktiebolaget LM Ericsson (publ), Stockholm (SE)

(72) Inventor: Qianxi Lu, Beijing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 395 days.

(21) Appl. No.: 16/324,734

(22) PCT Filed: Aug. 1, 2017

(86) PCT No.: PCT/CN2017/095496
§ 371 (c)(1),
(2) Date: Feb. 11, 2019

(87) PCT Pub. No.: WO2018/028478
PCT Pub. Date: Feb. 15, 2018

(65) Prior Publication Data
US 2019/0223195 A1    Jul. 18, 2019

(30) Foreign Application Priority Data

Aug. 12, 2016  (WO) ................ PCT/CN2016/094976
Jan. 22, 2017  (WO) ................ PCT/CN2017/072066

(51) Int. Cl.
*H04W 72/12*    (2009.01)
*H04W 72/10*    (2009.01)
(Continued)

(52) U.S. Cl.
CPC ..... *H04W 72/1242* (2013.01); *H04W 72/042* (2013.01); *H04W 72/0446* (2013.01);
(Continued)

(58) Field of Classification Search
None
See application file for complete search history.

(56) References Cited

U.S. PATENT DOCUMENTS

2015/0173048 A1  6/2015 Seo et al.
2018/0049224 A1* 2/2018 Dinan ................... H04W 72/04

FOREIGN PATENT DOCUMENTS

| CN | 102595596 A  | 7/2012 |
| CN | 104349483 A  | 2/2015 |
| WO | 2013051976 A1 | 4/2013 |

OTHER PUBLICATIONS

International Search Report and Written Opinion issued in International Application No. PCT/CN2017/095496, dated Oct. 27, 2017, 8 pages.

(Continued)

*Primary Examiner* — Chi H Pham
*Assistant Examiner* — Raul Rivas
(74) *Attorney, Agent, or Firm* — Rothwell, Figg, Ernst & Manbeck, P.C.

(57) ABSTRACT

Embodiments of the present disclosure relate to a method and device for semi-persistent scheduling (SPS). In example embodiments, the base station determines a plurality of SPS configurations for the terminal device and further indicates priority information associated with at least one of the plurality of SPS configurations to the terminal device. Accordingly, based on the priority information, the terminal device can select one of the SPS configurations for packet transmission. In this way, the SPS configurations may be utilized in a non-conflicting way.

10 Claims, 3 Drawing Sheets

(51) Int. Cl.
H04W 72/04 (2009.01)
H04W 72/06 (2009.01)
H04W 72/14 (2009.01)

(52) U.S. Cl.
CPC ........... *H04W 72/06* (2013.01); *H04W 72/10* (2013.01); *H04W 72/14* (2013.01)

(56) References Cited

OTHER PUBLICATIONS

International Preliminary Report on Patentability issued in International Application No. PCT/CN2017/095496, dated Nov. 12, 2018, 11 pages.
Supplementary European Search Report issued in European Application No. 17838608.2, dated Dec. 4, 2019 (7 pages).
3GP TSG-RAN WG2 Meeting #94 (R2-163771), Fujitsu, "Considerations on the SPS resource efficiency", Nanjing, China, May 23-27, 2016 (3 pages).
3GPP TSG RAN WG1 Meeting #85 (R1-164878), CMCC, "Discussion on SPS configurations", Nanjing, China, May 23-27, 2016 (4 pages).

\* cited by examiner

METHODS AND DEVICES FOR SEMI-PERSISTENT SCHEDULING

CROSS REFERENCE TO RELATED APPLICATION(S)

This application is a 35 U.S.C. § 371 National Stage of International Patent Application No. PCT/CN2017/095496, filed Aug. 1, 2017, designating the United States and claiming priority to International Patent Application No. PCT/CN2017/072066, filed on Jan. 22, 2017 and International Patent Application No. PCT/CN2016/094976, filed on Aug. 12, 2016. The above identified applications are incorporated by reference.

TECHNICAL FIELD

Embodiments of the present disclosure generally relate to the field of telecommunication, and in particular, to a method and device for semi-persistent scheduling (SPS).

BACKGROUND

Device-to-Device (D2D) communications have been extended to enable Vehicle-to-Everything (V2x) communications which may include direct communications between vehicles, pedestrians and network infrastructures. In the context of at least basic V2x connectivity, V2x communications may take advantage of network infrastructures, when available, so as to expand service coverage and reduce costs, for example. A Long Term Evolution (LTE)-based V2x interface has been proposed, which may further enable a close integration between Vehicle-to-Infrastructure (V2I), Vehicle-to-Pedestrian (V2P), and Vehicle-to-Vehicle (V2V) communications, as compared to using a single V2x technology.

The V2x communications may generally carry either non-safety or safety information. Furthermore, the applications and services in the V2x communications may be associated with a specific set of requirements, for example, in terms of latency, reliability, capacity, and the like. Accordingly, a traffic model for a V2x service may be periodical (or deterministic). For example, for a Cooperative Awareness Message (CAM) message applied in the V2x service, message arrival time and a packet size may be relatively deterministic. Specifically, the message arrival time may be an integral multiple of 100 ms. In other words, one packet may arrive per N×100 ms, where N=1, 2, . . . , 10. Furthermore, the message may have a packet size of 300 or 190 bytes depending on whether to include a security certificate.

In this situation, multiple SPS configurations have been proposed for V2x Work Item (WI) of the third generation partnership project (3GPP). These multiple SPS configurations with different configuration parameters can be assigned by the base station to terminal devices. Further, it has been proposed to allow the multiple SPS configurations to be active simultaneously at one UE. In this case, the SPS configurations and UE assistance information may be linked to one or more radio bearers. However, such simultaneous activity of the multiple SPS configurations may cause collisions at the UE. In other words, the packets with these simultaneously active SPS configurations would collide in some subframes.

When such a collision occurs in a certain subframe, the terminal device or base station has to determine which SPS configuration should be used in the subframe. Such determination will result in tedious and inefficient blind detection, as will be analyzed in the detailed description. At present, there is no effective and efficient proposal of how to utilize these SPS configurations at a terminal device in the V2x communications, for example via D2D sidelink or cellular uplink.

SUMMARY

In general, example embodiments of the present disclosure provide a method and device for SPS.

In a first aspect, a method implemented at a base station is provided. According to the method, the base station determines a plurality of SPS configurations for a terminal device. Then, the base station indicates priority information associated with at least one of the plurality of SPS configurations to the terminal device. Accordingly, the terminal device can select an SPS configuration from the at least one SPS configuration for packet transmission based on the priority information.

In some embodiments, the base station may determine a priority level of the at least one SPS configuration and indicate the priority level to the terminal device.

In some embodiments, the priority level may be determined based on an amount of resources to be allocated for uplink transmission of the terminal device. The amount of resources is indicated in an uplink grant associated with the at least one SPS configuration. Particularly, the amount of the resources to be allocated may include either a number of physical resource blocks or a size of a transport block.

In some embodiments, the base station may determine the priority level in association with a packet type for the terminal device.

In some embodiments, the base station may determine the priority level in association with a traffic type for the terminal device.

In some embodiments, the base station may indicate a priority level of the at least one SPS configuration in an information element (IE) to the terminal device.

In some embodiments, the base station may indicate, to the terminal device, a priority level of a packet type for the terminal device, wherein the priority level of the packet type is associated with a priority level of the at least one SPS configuration.

In some embodiments, the base station may indicate, to the terminal device, a logic channel identification corresponding to a traffic type for the terminal device, wherein the logic channel identification is associated with a priority level of the at least one SPS configuration.

In some embodiments, the base station may assign an index to the at least one SPS configuration, where the index is associated with a priority level of the at least one SPS configuration. Then, the base station may indicate the index to the terminal device.

In some embodiments, the base station may further receive, from the terminal device, an indication of the SPS configuration selected by the terminal device and adjust the priority information based on the indication.

In some embodiments, the plurality of SPS configurations may be applied for both cellular and D2D communications.

In a second aspect, a method implemented at a terminal device is provided. The method comprises receiving, from a base station, priority information associated with at least one of a plurality of SPS configurations for the terminal device. The method also comprises selecting, based on the priority information, an SPS configuration from the at least one SPS configuration for packet transmission.

In some embodiments, receiving the priority information may comprise: receiving, from the base station, the priority information indicative of a priority level of the at least one SPS configuration.

In some embodiments, the priority level may be associated with an uplink grant indicating an amount of resources to be allocated for uplink transmission. Further, selecting the SPS configuration may comprise: selecting the SPS configuration from the at least one SPS configuration based on the amount of resources to be allocated.

In some embodiments, the priority level may be associated with a packet type to be used by the terminal device. Furthermore, selecting the SPS configuration may comprise: determining the packet type to be used by the terminal device; and selecting the SPS configuration from the at least one SPS configuration based on the packet type.

In some embodiments, the priority level may be associated with a traffic type to be used by the terminal device. Furthermore, selecting the SPS configuration may comprise: determining the traffic type to be used by the terminal device; and selecting the SPS configuration from the SPS configurations based on the traffic type.

In some embodiments, receiving the priority information may comprise: receiving, from the base station, an indication of a priority level of the at least one SPS configuration in an information element, IE.

In some embodiments, receiving the priority information may comprise: receiving, from the base station, an indication of a priority level of a packet type for the terminal device, wherein the priority level of the packet type is associated with a priority level of the at least one SPS configuration.

In some embodiments, receiving the priority information may comprise: receiving, from the base station, an indication of a logic channel identification corresponding to a traffic type for the terminal device, wherein the logic channel identification is associated with a priority level of the at least one SPS configuration.

In some embodiments, receiving the priority information may comprise: receiving, from the base station, an indication of an index of the at least one SPS configuration; and determining a priority level of the at least one SPS configuration based on the index.

In some embodiments, the method may further comprise: sending, to the base station, an indication of the selected SPS configuration.

In a third aspect, a method implemented at a terminal device is provided. The method comprises receiving, from a base station, an uplink grant associated with at least one of a plurality of semi-persistent scheduling, SPS, configurations for the terminal device. The method also comprises selecting, based on the uplink grant, an SPS configuration from the at least one SPS configuration for transmission.

In some embodiments, the grant may comprise information indicating an amount of resources to be allocated for uplink transmission. Furthermore, selecting the SPS configuration may be based on the amount of resources to be allocated for uplink transmission.

In a fourth aspect, a base station is provided. The base station comprises a first determining unit and a first indicating unit. The first determining unit is configured to determine a plurality of SPS configurations for a terminal device. The first indicating unit is configured to indicate priority information associated with at least one of the plurality of SPS configurations to the terminal device, so that the terminal device can select a SPS configuration from the at least one SPS configuration for packet transmission based on the priority information.

In a fifth aspect, a terminal device is provided. The terminal device comprises a first receiving unit and a first selecting unit. The first receiving unit is configured to receive, from a base station, priority information associated with at least one of a plurality of SPS configurations for the terminal device. The first selecting unit is configured to select, based on the priority information, a SPS configuration from the at least one SPS configuration for packet transmission.

In some embodiments, the first receiving unit is configured to receive, from the base station, an uplink grant associated with at least one of a plurality of SPS configurations for the terminal device. The first selecting unit is configured to select, based on the uplink grant, an SPS configuration from the at least one SPS configuration for transmission.

In a sixth aspect, there is provided an apparatus at a base station. The apparatus comprises a processor and a memory. The memory contains instructions executable by the processor, whereby the apparatus is operative to perform the method according to the first aspect.

In a seventh aspect, there is provided an apparatus at a terminal device. The apparatus comprises a processor and a memory. The memory contains instructions executable by the processor whereby the apparatus is operative to perform the method according to the second or third aspect.

In an eighth aspect, there is provided a computer readable storage medium. The computer readable storage medium tangibly storing a computer program product including instructions which, when executed on at least one processor, cause the at least one processor to carry out the method according to the first, second, or third aspect.

Through the following description, it would be appreciated that according to various aspects and embodiments of the present disclosure, the base station determines a plurality of SPS configurations for the terminal device and further indicates priority information associated with at least one of the plurality of SPS configurations to the terminal device. Accordingly, the terminal device can select, based on the priority information, one of the SPS configurations for packet transmission. In this way, the SPS configurations may be utilized by the terminal device in a non-conflicting way.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "base station" (BS) refers to a device which is capable of providing or hosting a cell or coverage where terminal devices can communicate. Examples of a BS include, but not limited to, a Node B (NodeB or NB), an Evolved NodeB (eNodeB or eNB), a gNB, a Remote Radio Unit (RRU), a radio head (RH), a remote radio head (RRH), a low power node such as a femto node, a pico node, and the like. For the purpose of discussion, in the following, some embodiments will be described with reference to eNB as an example of the base station.

As used herein, the term "terminal device" or "user equipment" (UE) refers to any device having wireless or wired communication capabilities. Examples of the terminal device include, but not limited to, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. The terminal device may also include vehicles in V2x communications via D2D sidelink, or cellular uplink. For the purpose of discussion, in the following, some embodiments will be described with reference to UEs as examples of terminal devices and the terms "terminal device" and "user equipment" (UE) may be used interchangeably in the context of the present disclosure.

As used herein, the term "semi-persistent scheduling" (SPS) refers to a type of pre-scheduling where the base station allocates resources, such as physical resource blocks (PRBs), transmission modes, modulation and coding schemes, and the like, to the terminal device in advance. The SPS may be applied to either sidelink in D2D communications or uplink in cellular communications. For an SPS configuration, the allocated resources, transmission modes, or modulation and coding schemes may be valid for a certain time period.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

In some examples, values, procedures, or apparatus are referred to as "lowest," "highest," "minimum," or the like. It will be appreciated that such descriptions are intended to indicate that a selection among many used functional alternatives can be made, and such selections need not be better, smaller, or otherwise preferable to other selections.

As described above, for the V2x service, the traffic model is generally periodical or deterministic. For example, for the CAM message, one packet may arrive per N×100 ms, where N=1, 2, . . . , 10, and each packet may have various sizes, including, for example, 300 or 190 bytes, depending on whether to include the security certificate. In 3GPP standards (for example, 3GPP TR 36.885 V14.0.0), some periodical traffic models have been proposed. For example, for periodic traffic, message generation periods are defined in the following 5 distinctive scenarios in Table 1, which is Table A. 1.5-1 in 3GPP TR 36. 885 V14.0.0.

TABLE 1

| Index | Vehicle Dropping Scenarios | Absolute Vehicle Speed (km/h) | Message Generation Period (ms) |
|---|---|---|---|
| 1 | Freeway | 140 | 100 |
| 2 | Freeway | 70 | 100 |
| 3 | Urban | 60 | 100 |
| 4 | Urban | 15 | 100 |
| 5 | Urban | 15 | 500 |

As shown in Table 1, a message generation period is fixed to be 100 or 500 ms, where the period of 100 ms is assigned to a 190-byte message and the period of 500 ms is assigned to a 300-byte message, for example. Furthermore, it has been proposed that one 300-byte message is followed by four 190-byte messages in message transmission. As a result, multiple SPS configurations (multiple periods and PRB/MCS configurations) have been proposed for the V2x WI of the 3GPP to enhance a legacy single SPS configuration (for example, a single period and a single PRB/MCS configuration). The multiple SPS configurations may cover different V2x messages with different periods and packet sizes.

It has been proposed that multiple SPS configurations with different configuration parameters can be assigned by the eNB to UEs and that multiple SPS configurations may be allowed to be active at the same time. In this case, the SPS configurations and UE assistance information may be linked to one or more radio bearers. However, such simultaneous activity of the multiple SPS configurations may cause collisions between each other within a same UE.

For example, if an SPS configuration (referred to as a "first SPS configuration") with a period of 100 ms and a packet size of 190 bytes and a further SPS configuration (referred to as a "second SPS configuration") with a period of 500 ms and a packet size of 380 bytes are activated at the same time, every 5th packet with the first SPS configuration may collide in a corresponding subframe with a packet with the second SPS configuration. In other words, the packets with these simultaneously active SPS configurations would collide at some subframes.

When such a collision occurs in a certain subframe, the UE or the eNB needs to determine which SPS configuration should be used in that subframe. If a selection of the SPS configuration is made at the UE, the eNB may need to blindly detect the multiple SPS configurations so as to figure out the SPS configuration selected by the UE. Such blind detection is tedious and inefficient. Furthermore, if the eNB is unaware of the SPS configuration used by the UE, the eNB may not schedule other UEs to use the resources allocated for an SPS configuration which is actually not used. As a result, limited resources will be wasted.

In order to at least in part solve the above and other potential problems, embodiments of the present disclosure allow the base station to determine a plurality of SPS configurations for the terminal device and further to indicate priority information associated with at least one of the plurality of SPS configurations to the terminal device. Accordingly, the terminal device can select, based on the priority information, one of the SPS configurations for packet transmission. In this way, the SPS configurations may be utilized in a non-conflicting way.

Figure 1:
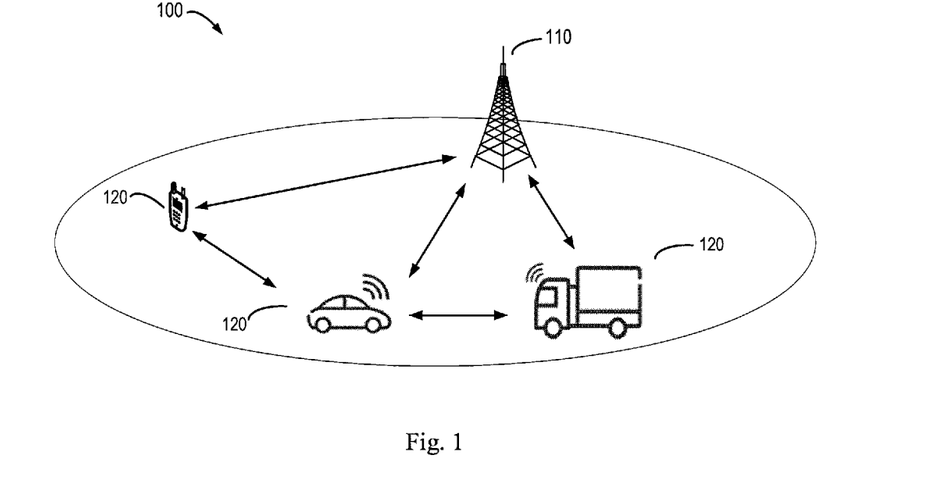
FIG. 1 is a block diagram of a communication network in which embodiments of the present disclosure can be implemented.

FIG. 1 shows an example communication network 100 in which embodiments of the present disclosure can be implemented. The network 100 includes a base station 110 and three terminal devices 120. It is to be understood that the number of base stations and terminal devices is only for the purpose of illustration without suggesting any limitation. The network 100 may include any suitable number of base stations and the terminal devices adapted for implementing embodiments of the present disclosure.

The network 100 may enable cellular communications between the base station 110 and the three terminal devices 120 and between the terminal devices 120 via the base station 110. Alternatively or additionally, the network 100 may enable D2D communications directly between the terminal devices 120.

The communications may conform to any suitable standard including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As described above, according to embodiments of the present disclosure, the base station 110 determines a plurality of SPS configurations for each terminal device 120 and further indicates, to the terminal device 120, priority information associated with at least one of the SPS configurations. In this way, the terminal device 120 can select one of the SPS configurations based on the priority information for the packet transmission.

Figure 2:
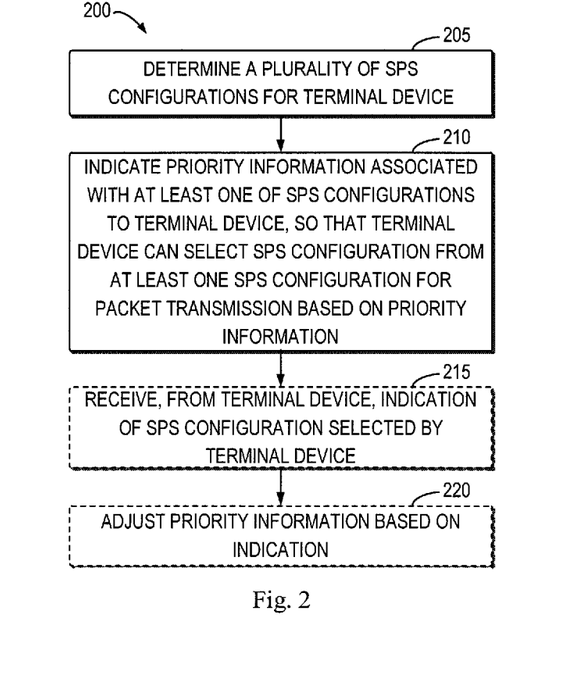
FIG. 2 is a flowchart of a method in accordance with some embodiments of the present disclosure.
Figure 3:
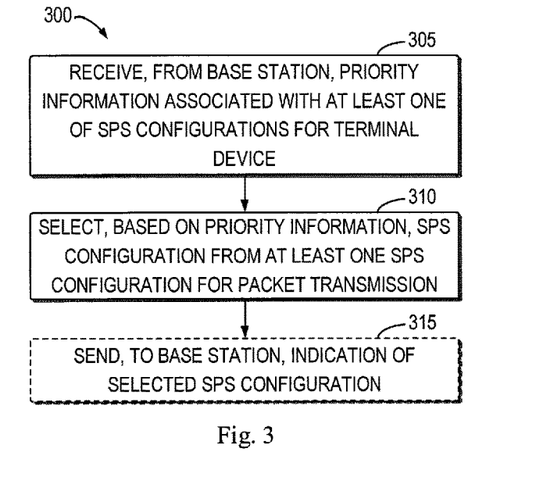
FIG. 3 is a flowchart of a method in accordance with some other embodiments of the present disclosure.

With reference to FIGS. 2 and 3, principles and implementations of the present disclosure will be described in detail below from the perspective of the base station and the terminal device, respectively. Reference is first made to FIG. 2 which shows a flowchart of an example method 200 in accordance with some embodiments of the present disclosure. For the purpose of discussion rather than limitation, the method 200 will be described with reference to FIG. 1. The method 200 can be implemented at the base station 110 as shown in FIG. 1.

At block 205, the base station 110 determines a plurality of SPS configurations for the terminal device 120. These SPS configurations may be applied for both the cellular and D2D communications. According to embodiments of the present disclosure, the SPS configurations may be determined for the terminal device 120 by using any suitable technology either already known or to be developed in the future. The scope of the present disclosure is not limited in this regard.

At block 210, the base station 110 indicates to the terminal device 120 priority information associated with at least one of the determined SPS configurations. Accordingly, based on the indicated priority information, the terminal device 120 can select one of the SPS configurations for use in packet transmission. In this way, with the priority information, multiple terminal devices 120 may be scheduled to transmit packets in a way that enables significantly reduced collisions of packet transmission at the terminal device 120.

The priority information may be any suitable information that is associated with a priority level of an SPS configuration. In some embodiments, the priority information may be the priority level itself. For example, the base station 110 may determine priority levels of the SPS configurations which are determined at block 205. Then, the base station 110 may indicate the priority levels to the terminal device 120.

Further, the terminal device 120 may select an SPS configuration from the SPS configurations based on the priority levels. For example, in some situations, the terminal device 120 may select the SPS configuration with the highest priority level. The operations at the terminal device 120 will be detailed in the following paragraphs with reference to FIG. 3.

It is to be understood that the determination and indication of all the priority levels of the SPS configurations are optional but not necessary. In some embodiments, the base station 110 may determine and indicate some of the SPS configurations with the higher priority levels, or even only the SPS configuration with the highest priority level.

According to embodiments of the present disclosure, the priority levels of the SPS configurations may be determined by the base station 110 by taking any suitable factor into account.

In some embodiments of the present disclosure, each SPS configuration is associated with a grant for uplink scheduling, i.e. an uplink grant. The priority information may be determined from the uplink grant issued by the base station. The uplink grant includes information indicating an amount of resources to be allocated for uplink transmission of the terminal device. Particularly, the amount of the resources to be allocated may refer to either the number of physical resource blocks, or a size of a transport block, i.e. the number of bits to be carried on the resources allocated by the grant, which may be referred to as Transport Block Size, TBS. Considering that an uplink grant indicating a bigger amount of resources can provide more space for a terminal device to carry its traffic, it will be more helpful for the terminal device to deliver the traffic. Thus, the SPS configuration associated with the uplink grant indicating the bigger amount of resources will have a higher priority level.

It shall be understood by those skilled in the art that in this embodiment, the base station may not necessarily explicitly determine and indicate the priority information/level to the terminal device. The terminal device can obtain the priority information/level implicitly from the uplink grant. For example, the amount of resources to be allocated by a grant can be indicated in downlink control information (DCI) when initiating an SPS configuration, so it can be known by the terminal device in advance. The terminal device can obtain the priority information/level of the SPS configuration from the grant associated with that SPS configuration. In other words, the base station implicitly indicates the priority information of the SPS configuration to the terminal device via the uplink grant.

It shall be appreciated that the uplink grant is sent from the base station to the terminal device, accordingly both the base station and the terminal device have knowledge of the grant and thus of the amount of resources to be allocated. In an embodiment, the SPS configuration can be selected directly based on the knowledge of the grant, particularly on the amount of resources to be allocated. In this embodiment, the determination and indication of priority information can be regarded as being implicitly performed.

In some other embodiments, a priority level of an SPS configuration may be associated with a packet type for the terminal device 120. In such embodiments, the priority level of the SPS configuration may be determined in association with the packet type for the terminal device.

As described above, in the V2x communications, the terminal devices may communicate, for example, in two packet types which include a smaller packet having a shorter period of 100 ms and a smaller size of 190 bytes and a larger packet having a longer period of 500 ms and a larger size of 300 bytes. Furthermore, these two packet types are assigned with two SPS configurations having different numbers of PRBs and MCSs. In this case, if the terminal device 120 is to transmit the smaller packet, the SPS configuration assigned to the shorter packet is prioritized. If the terminal device 120 is to transmit the larger packet, the SPS configuration assigned to the larger packet is prioritized.

Alternatively, or in addition, in other embodiments, a priority level of an SPS configuration may be associated with a traffic type for the terminal device 120. In such embodiments, the priority level of the SPS configuration may be determined in association with the traffic type for the terminal device. For example, different SPS configurations assigned to different traffic types may have different priority levels. If the terminal device 110 is to use a specific traffic type, the SPS configuration assigned to the traffic type may have a higher priority level.

As described above, in the V2x communications, the larger packet generally includes a security certificate which may be used for the reception of the smaller packet. In this case, as an example, if the terminal device 120 is to transmit the security certificate, the SPS configuration for the transmission of the security certificate may have a higher priority level.

In addition to or instead of the above examples, other traffic properties may be taken into account in determining a priority level of an SPS configuration. Examples of such properties may include, but not limited to, requirements of latency, quality of service (QoS), reliability, and the like. For example, if the terminal device 120 is to initiate the traffic requiring a lower latency, the SPS configuration having a shorter message generation period may have a higher priority.

It is to be understood that the determination of the priority levels of the SPS configurations may not necessarily be implemented by the base station 110. In some embodiments, the priority levels may be determined by other network devices, such as a radio network controller, or even a core network device. Accordingly, the base station 110 may obtain the priority information from these network devices and further indicate it to the terminal device 120.

According to embodiments of the present disclosure, the priority information may be indicated by the base station 110 to the terminal device 120 in any suitable information. In some embodiments, the base station 110 may use an information element (IE) to indicate which SPS configuration has a higher level. For example, different values of the IE may indicate different priority levels. The IE may be implemented as a new IE which is designed dedicatedly for indicating the priority level of the SPS configuration. Alternatively, an existing IE may be reused to implement the indications.

In some embodiments, a priority level of an SPS configuration corresponds to a priority level of a packet type. In conventional V2x communications, depending on the requirements of QoS, for example, a packet type may correspond to a specific priority level which is indicated using a priority value, such as a ProSe Per-Packet Priority (PPPP) value. For example, the 300-byte packet is associated with a packet priority I, while the 190-byte packet is associated with a packet priority II. In this case, according to embodiments of the present disclosure, the priority level of the packet type can be reused to indicate the priority level of the corresponding SPS configuration. Specifically, the priority level of the SPS configuration for the corresponding packet type may be indicated by the priority level of the packet type.

The indication of the priority level of the SPS configuration by the priority level of the corresponding packet type may be combined with the determination of the priority level of the SPS configurations based on the packet type as described above. For example, if a priority level of an SPS configuration is determined based on the corresponding packet type, the priority level of the SPS configuration may be indicated by the priority level of the packet type.

It is also possible that the indication and the determination may be separated from each other. For example, the association between a priority level of a packet type and a priority level of an SPS configuration may be built in advance, for example, between the base station 110 and the terminal device 120. Then, the base station 110 may use the priority level of the packet type to indicate the corresponding priority level of the SPS configuration to the terminal device 120.

In other embodiments, the priority level of the SPS configuration may be indicated by a logic channel identification (ID) corresponding to a traffic type for the terminal device 120. In the V2x communications, a traffic type may be conventionally assigned to a logical channel ID. According to embodiments of the present disclosure, the logical channel ID may be reused to indicate the priority of the SPS configuration. For example, one logical channel ID may be associated with a priority of an SPS configuration in advance, and a higher ID value indicates a higher priority level of the SPS configuration, and vice versa, for example.

Specifically, as described above, the priority level of the SPS configuration may be determined based on the traffic type, and the traffic type has an associated logical channel ID. Therefore, in those embodiments where a traffic type is used to determine the priority level, the priority level can be indicated by the logical channel associated with that traffic type.

In addition to or instead of the IE, the priority level of the packet type, and the logical channel ID as discussed above, in some embodiments, the priority level of the SPS configuration may be indicated by an index of the SPS configuration. For example, in some embodiments, each SPS configuration is assigned with an index which is associated with its priority level. In such embodiments, the base station 110 may indicate the priority of the SPS configuration using the associated index.

Alternatively, or in addition, the base station 110 may send signaling to the terminal device 120 to explicitly indicate a priority level of an SPS configuration or the SPS configuration to be used by the terminal device. Examples of the signaling may include, but not limited to, signaling in a physical control channel, such as physical downlink control channel (PDCCH), a media access control (MAC) control element (CE), or radio resource control (RRC) signaling.

Still with reference to FIG. 2, in some embodiments, at block 215, the base station 110 may receive an indication of the SPS configuration that is selected by the terminal device 120. The indication of the selected SPS configuration may be implemented in signaling sent by the terminal device 120 to the base station 110. Examples of the signaling may include, but not limited to, signaling in a physical control channel, such as physical uplink control channel (PUCCH), a MAC CE, or RRC signaling. As a response, at block 220, the base station 110 may adjust the priority information based on the received indication. In this way, the priority levels of the SPS configurations may be updated in real time based on the use of the SPS configurations. Then, unused SPS configurations may be prioritized, and therefore resource utilization may be further enhanced.

FIG. 3 shows a flowchart of an example method 300 in accordance with some other embodiments of the present disclosure. The method 300 can be implemented at the terminal device 120 as shown in FIG. 1. For the purpose of discussion, the method 300 will be described with reference to FIG. 1.

At block 305, the terminal device 120 receives from the base station 110 priority information associated with at least one of a plurality of SPS configurations for the terminal device 120. As described above, these SPS configurations may be applied for both the cellular and D2D communications.

At block 310, based on the priority information, the terminal device 120 selects an SPS configuration from the at least one SPS configuration for packet transmission. As described above, the priority information may be any suitable information that is associated with a priority level of an SPS configuration. In some embodiments, the priority information may be the priority level itself. Accordingly, the terminal device 120 may select one of the SPS configurations with a higher priority level.

The priority level may be associated with any suitable factor. In some embodiments, the priority level may be associated with an amount of resources to be allocated by an uplink grant. In an embodiment, the terminal device 120 may receive an uplink grant from the base station which indicates an amount of resources to be allocated for uplink transmission associated with an SPS configuration. Particularly, the amount of the resources to be allocated may refer to either a number of physical resource blocks, or a size of a transport block, i.e. the number of bits to be carried on the resources allocated by the grant, which may be referred to as Transport Block Size, TBS. Then, the terminal device can obtain the priority information/level of the SPS configuration from the uplink grant, particularly based on the resource amount as discussed above. In such a case where the priority information/level is explicitly obtained, the terminal device can select an SPS configuration based on the priority information/level.

In another embodiment, the terminal device may select the SPS configuration directly based on the amount of resources as indicated by the uplink grant without explicitly obtaining the priority information/levels of the SPS configurations. For example, the terminal device may select an SPS configuration associated with an uplink grant indicating a larger amount of resources over another SPS configuration associated with an uplink grant indicating a smaller amount of resources.

In some embodiments, the priority level may be associated with a packet type to be used by the terminal device 120. As described above, the SPS configurations for different packet types may be assigned to different priority levels. In response to a packet type to be used by the terminal device 120, the terminal device 120 may select the SPS configuration having a higher priority level for the packet type.

The priority level may be also associated with a traffic type to be used by the terminal device 120. Likewise, the SPS configurations for different traffic types may correspond to different priority levels, as described above. Accordingly, the terminal device 120 may select one of the SPS configurations having a higher priority level for the traffic type to be used.

The priority level of the SPS configuration may be indicated in any suitable information, as described above. For example, an existing or new IE may be used for the indication. As another example, a priority level of a packet type and/or a logical channel ID corresponding to a traffic type may be reused to indicate a priority level of an SPS configuration.

Alternatively, or in addition, an index of an SPS configuration may be used for indicating the priority level of the SPS configuration. In this case, after receiving an indication of the indices of the SPS configurations from the base station 110, the terminal device 120 may determine priority levels of the SPS configurations based on the indices. The signaling sent from the base station 110 may also be used to indicate the priority level of the SPS configuration, as described above.

In some embodiments, at block 315, the terminal device 120 may send an indication of the selected SPS configuration to the base station 110. Based on the received indication, the base station 110 may update the priority levels of the SPS configurations, such that unused SPS configurations may be prioritized. As a result, the resource utilization may be further improved.

Figure 4:
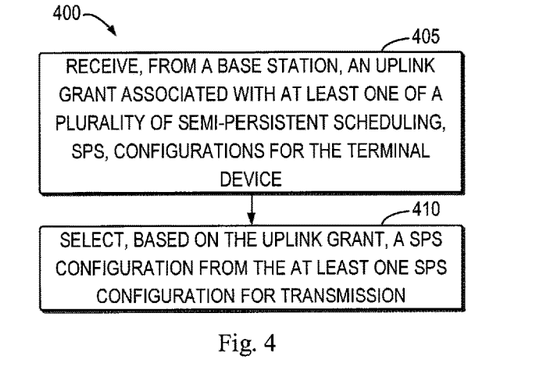
FIG. 4 is a flowchart of a method in accordance with some other embodiments of the present disclosure.

FIG. 4 shows a flowchart of an example method 400 in accordance with some other embodiments of the present disclosure. The method 400 can be implemented at the terminal device 120 as shown in FIG. 1. For the purpose of discussion, the method 400 will be described with reference to FIG. 1.

At block 405, the terminal device 120 receives, from the base station 110, an uplink grant associated with at least one of a plurality of semi-persistent scheduling, SPS, configurations for the terminal device 120. At block 410, based on the uplink grant, the terminal device 120 selects an SPS configuration from the at least one SPS configuration for packet transmission. In some embodiments, the grant comprises information indicating an amount of resources to be allocated for uplink transmission. In this case, the SPS configuration may be selected based on the amount of resources to be allocated for uplink transmission.

It is to be understood that all operations and features related to the base station 110 described above with reference to FIG. 2 are likewise applicable to the methods 300 and 400 and have similar effects. For the purpose of simplification, the details will be omitted.

Figure 5:
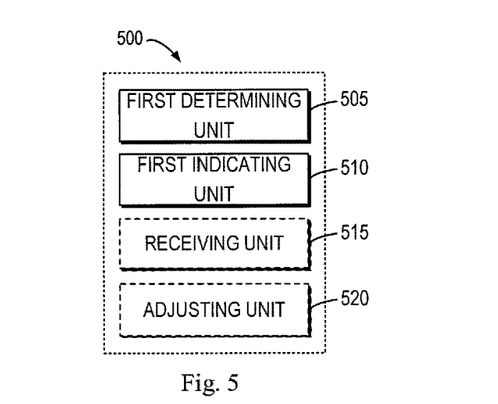
FIG. 5 is a block diagram of a base station in accordance with some embodiments of the present disclosure.

FIG. 5 shows a block diagram of a base station 500 in accordance with some embodiments of the present disclosure. The base station 500 can be considered as an example implementation of the base station 110 as shown in FIG. 1.

As shown, the base station 500 comprises: a first determining unit 505 configured to determine a plurality of SPS configurations for a terminal device; and a first indicating unit 510 configured to indicate priority information associated with at least one of the plurality of SPS configurations to the terminal device, so that the terminal device can select an SPS configuration from the at least one SPS configuration for packet transmission based on the priority information. In some embodiments, the plurality of SPS configurations may be applied for both cellular and D2D communications.

In some embodiments, the first indicating unit 510 may comprise: a second determining unit (not shown) configured to determine a priority level of the at least one SPS configurations; and a second indicating unit (not shown) configured to indicate the priority level to the terminal device.

In some embodiments, the second determining unit may comprise: a third determining unit configured to determine the priority level based on an amount of resources to be allocated for uplink transmission of the terminal device. The amount of resources is indicated in an uplink grant associated with the at least one SPS configuration.

In some embodiments, the second determining unit may comprise: a fourth determining unit configured to determine the priority level in association with a packet type for the terminal device. In some other embodiments, the second determining unit may comprise: a fifth determining unit configured to determine the priority level in association with a traffic type for the terminal device.

In some embodiments, the first indicating unit 510 may comprise: a third indicating unit configured to indicate a priority level of the at least one SPS configuration in an IE to the terminal device. In some embodiments, the first indicating unit 510 may comprise: a fourth indicating unit configured to indicate, to the terminal device, a priority level of a packet type for the terminal device, where the priority level of the packet type is associated with a priority level of the at least one SPS configuration.

In some embodiments, the first indicating unit 510 may comprise: a fifth indicating unit configured to indicate, to the terminal device, a logic channel identification corresponding to a traffic type for the terminal device, where the logic channel identification is associated with a priority level of the at least one SPS configuration. In some other embodiments, the first indicating unit 510 may comprise: an assigning unit configured to assign an index to the at least one SPS configuration, where the index is associated with a priority level of the at least one SPS configuration; and a sixth indicating unit configured to indicate the index to the terminal device.

In some embodiments, the base station 500 may further comprise: a receiving unit 515 configured to receive, from the terminal device, an indication of the SPS configuration selected by the terminal device; and an adjusting unit 520 configured to adjust the priority information based on the indication.

Figure 6:
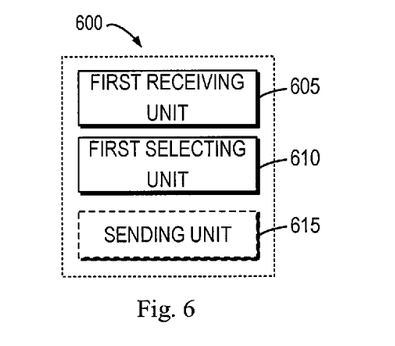
FIG. 6 is a block diagram of a terminal device in accordance with some embodiments of the present disclosure.

FIG. 6 shows a block diagram of a terminal device 600 in accordance with some embodiments of the present disclosure. The terminal device 600 can be considered as an example implementation of the terminal device 120 as shown in FIG. 1.

As shown, the terminal device 600 comprises: a first receiving unit 605 configured to receive, from a base station, priority information associated with at least one of a plurality of SPS configurations for the terminal device; and a first selecting unit 610 configured to select, based on the priority information, an SPS configuration from the at least one SPS configuration for packet transmission. In some embodiments, the plurality of SPS configurations may be applied for both cellular and D2D communications.

In some embodiments, the first receiving unit 605 may comprise: a second receiving unit configured to receive, from the base station, the priority information indicative of a priority level of the at least one SPS configuration.

In some embodiments, the priority level is associated with an uplink grant indicating an amount of resources to be allocated for uplink transmission. In these embodiments, the first selecting unit 610 may comprise: a second selecting unit configured to select the SPS configuration from the at least one SPS configuration based on the amount of resources to be allocated. The amount of the resources to be allocated may include either a number of physical resource blocks or a size of a transport block.

In some embodiments, the priority level may be associated with a packet type to be used by the terminal device. In these embodiments, the first selecting unit 610 may comprise: a first determining unit configured to determine the packet type to be used by the terminal device; and a third selecting unit configured to select the SPS configuration from the at least one SPS configuration based on the packet type.

In some embodiments, the priority level may be associated with a traffic type to be used by the terminal device. In these embodiments, the first selecting unit 610 may comprise: a second determining unit configured to determine the traffic type to be used by the terminal device; and a fourth selecting unit configured to select the SPS configuration from the SPS configurations based on the traffic type.

In some embodiments, the first receiving unit 605 may comprise: a third receiving unit configured to receive, from the base station, an indication of a priority level of the at least one SPS configuration in an IE. In some embodiments, the first receiving unit 605 may comprise: a fourth receiving unit configured to receive, from the base station, an indication of a priority level of a packet type for the terminal device, where the priority level of the packet type is associated with a priority level of the at least one SPS configuration.

In some embodiments, the first receiving unit 605 may comprise: a fifth receiving unit configured to receive, from the base station, an indication of a logic channel identification corresponding to a traffic type for the terminal device, where the logic channel identification is associated with a priority level of the at least one SPS configuration. In some other embodiments, the first receiving unit 605 may comprise: a sixth receiving unit configured to receive, from the base station, an indication of an index of the at least one SPS configuration; and a third determining unit configured to determine a priority level of the at least one SPS configuration based on the index.

In some embodiments, the terminal device 600 may further comprise: a sending unit 615 configured to send, to the base station, an indication of the selected SPS configuration.

Figure 7:
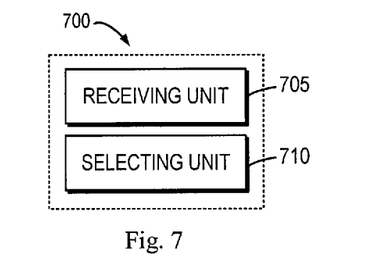
FIG. 7 is a block diagram of a terminal device in accordance with some other embodiments of the present disclosure.

FIG. 7 shows a block diagram of a terminal device 700 in accordance with some embodiments of the present disclosure. The terminal device 700 can be considered as an example implementation of the terminal device 120 as shown in FIG. 1.

As shown, the terminal device 700 comprises: a receiving unit 705 configured to receive, from a base station, an uplink grant associated with at least one of a plurality of semi-persistent scheduling, SPS, configurations for the terminal device; and a selecting unit 710 configured to select, based on the uplink grant, a SPS configuration from the at least one SPS configuration for transmission.

In some embodiments, the grant may comprise information indicating an amount of resources to be allocated for uplink transmission. In these embodiments, the fourth selecting unit may be further configured to select the SPS configuration is based on the amount of resources to be allocated for uplink transmission.

It should be appreciated that units included in the base station 400 and the terminal devices 600 and 700 correspond to the blocks of the methods 200, 300, and 400, respectively. Therefore, all operations and features described above with reference to FIGS. 1 to 4 are likewise applicable to the units included in the base station 500 and the terminal devices 600 and 700 and have similar effects. For the purpose of simplification, the details will be omitted.

The units included in the base station 500 and the terminal devices 600 and 700 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the base station 500 and the terminal devices 600 and 700 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 8:
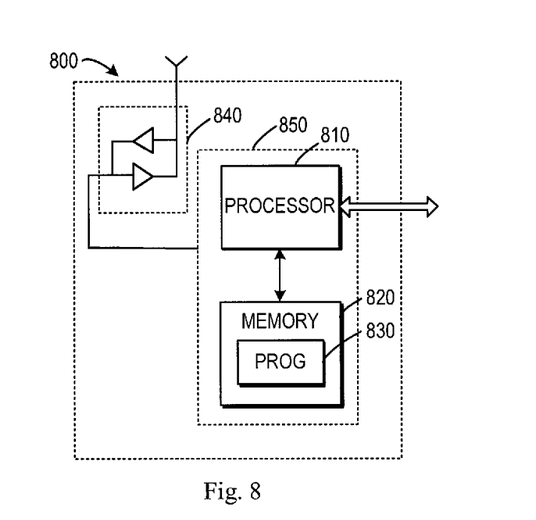
FIG. 8 is a simplified block diagram of a device that is suitable for implementing embodiments of the present disclosure.

FIG. 8 is a simplified block diagram of a device 800 that is suitable for implementing embodiments of the present disclosure. The device 800 can be considered as a further example implementation of the base station 110 or the terminal device 120 as shown in FIG. 1. Accordingly, the device 800 can be implemented at or as at least a part of the base station 110 or the terminal device 120, respectively.

As shown, the device 800 includes a processor 810, a memory 820 coupled to the processor 810, a suitable transmitter (TX) and receiver (RX) 840 coupled to the processor 810, and a communication interface coupled to the TX/RX 840. The memory 810 stores at least a part of a program 830. The TX/RX 840 is for bidirectional communications. The TX/RX 840 has at least one antenna to facilitate communication, though in practice an Access Node mentioned in this application may have several ones. The communication interface may represent any interface that is necessary for communication with other network elements, such as X2 interface for bidirectional communications between eNBs, Si interface for communication between a Mobility Management Entity (MME)/Serving Gateway (S-GW) and the eNB, Un interface for communication between the eNB and a relay node (RN), or Uu interface for communication between the eNB and a terminal device.

The program 830 is assumed to include program instructions that, when executed by the associated processor 810, enable the device 800 to operate in accordance with the embodiments of the present disclosure, as discussed herein with reference to FIG. 2 or 3. The embodiments herein may be implemented by computer software executable by the processor 810 of the device 800, or by hardware, or by a combination of software and hardware. The processor 810 may be configured to implement various embodiments of the present disclosure as discussed above with reference to FIG. 2 or 3. Furthermore, a combination of the processor 810 and memory 810 may form processing means 850 adapted to implement various embodiments of the present disclosure.

The memory 810 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 810 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200, 300, or 400 as described above with reference to FIG. 2, 3, or 4, respectively. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a terminal device, the method comprising:
   receiving, from a base station, priority information associated with at least one of two or more semi-persistent scheduling (SPS) configurations for the terminal device; and
   selecting, based on the priority information, an SPS configuration from the two or more SPS configurations for packet transmission, wherein
   receiving the priority information associated with at least one of the two or more SPS configurations comprises receiving from the base station first priority information associated with a first SPS configuration and second priority information associated with a second SPS configuration,
   the first priority information is associated with a first priority level,
   the second priority information is associated with a second priority level, and
   selecting an SPS configuration from the two or more SPS configurations includes selecting, based on the first and second priority levels, one of the first SPS configuration and the second SPS configuration.

2. The method of claim 1, wherein receiving the priority information comprises:
   receiving, from the base station, the priority information indicative of a priority level of the at least one SPS configuration.

3. The method of claim 2, wherein
   the priority level is associated with an uplink grant indicating an amount of resources to be allocated for uplink transmission, and
   selecting the SPS configuration comprises selecting the SPS configuration from the two or more SPS configurations based on the amount of resources to be allocated.

4. The method of claim 3, wherein the amount of the resources to be allocated includes either a number of physical resource blocks or a size of a transport block.

5. The method of claim 2, wherein
   the priority level is associated with a packet type to be used by the terminal device, and
   selecting the SPS configuration comprises: determining the packet type to be used by the terminal device; and selecting the SPS configuration from the two or more SPS configurations based on the packet type.

6. The method of claim 2, wherein
   the priority level is associated with a traffic type to be used by the terminal device, and
   selecting the SPS configuration comprises: determining the traffic type to be used by the terminal device; and selecting the SPS configuration from the two or more SPS configurations based on the traffic type.

7. The method of claim 2, wherein receiving the priority information comprises:
   receiving, from the base station, an indication of a priority level of the at least one SPS configuration in an information element (IE); or receiving, from the base station, an indication of a priority level of a packet type for the terminal device, wherein the priority level of the packet type is associated with a priority level of the at least one SPS configuration; or receiving, from the base station, an indication of a logic channel identification corresponding to a traffic type for the terminal device, wherein the logic channel identification is associated with a priority level of the at least one SPS configuration; or receiving, from the base station, an indication of an index of the at least one SPS configuration; and
   determining a priority level of the at least one SPS configuration based on the index.

8. The method of claim 2, further comprising sending, to the base station, an indication of the selected SPS configuration.

9. The method of claim 2, wherein the two or more SPS configurations are applied for both cellular and device-to-device communications.

10. The method of claim 1, wherein
    the first priority information comprises or consists of information specifying or indicating the first priority level, and
    the second priority information comprises or consists of information specifying or indicating the second priority level.

* * * * *